US012573668B2

(12) United States Patent
Li et al.

(10) Patent No.: US 12,573,668 B2
(45) Date of Patent: Mar. 10, 2026

(54) NEUTRAL ZINC MANGANESE SECONDARY BATTERY AND ELECTROLYTE

(71) Applicant: DALIAN INSTITUTE OF CHEMICAL PHYSICS, CHINESE ACADEMY OF SCIENCES, Dalian (CN)

(72) Inventors: Xianfeng Li, Dalian (CN); Congxin Xie, Dalian (CN); Huamin Zhang, Dalian (CN)

(73) Assignee: DALIAN INSTITUTE OF CHEMICAL PHYSICS, CHINESE ACADEMY OF SCIENCES, Dalian (CN)

( * ) Notice: Subject to any disclaimer, the term of this patent is extended or adjusted under 35 U.S.C. 154(b) by 0 days.

(21) Appl. No.: 17/753,683

(22) PCT Filed: Dec. 12, 2019

(86) PCT No.: PCT/CN2019/124731
§ 371 (c)(1),
(2) Date: Mar. 10, 2022

(87) PCT Pub. No.: WO2021/047085
PCT Pub. Date: Mar. 18, 2021

(65) Prior Publication Data
US 2022/0344727 A1     Oct. 27, 2022

(30) Foreign Application Priority Data
Sep. 11, 2019   (CN) .......................... 201910857338.1

(51) Int. Cl.
*H01M 10/38*         (2006.01)
(52) U.S. Cl.
CPC .... *H01M 10/38* (2013.01); *H01M 2300/0005* (2013.01)

(58) Field of Classification Search
CPC ........ H01M 8/18; H01M 8/184; H01M 8/188; H01M 10/24–28; H01M 10/36; H01M 50/409–431; Y02E 60/10
See application file for complete search history.

(56) References Cited

U.S. PATENT DOCUMENTS

| | | | |
|---|---|---|---|
| 2015/0004452 A1* | 1/2015 | Dilleen | ............. H01M 10/0431 |
| | | | 429/105 |
| 2016/0301096 A1 | 10/2016 | Zhamu et al. | |
| 2022/0093954 A1* | 3/2022 | Jung | ..................... H01M 8/188 |

FOREIGN PATENT DOCUMENTS

| | | |
|---|---|---|
| CN | 101677135 A | 3/2010 |
| CN | 105206879 A | 12/2015 |

(Continued)

OTHER PUBLICATIONS

Machine translation of Wen et al. CN 105336971. Originally available Feb. 17, 2016 (Year: 2016).*

(Continued)

*Primary Examiner* — Nicole M. Buie-Hatcher
*Assistant Examiner* — Jacob Buchanan
(74) *Attorney, Agent, or Firm* — NKL Law; Allen Xue

(57) ABSTRACT

The neutral zinc manganese battery includes a neutral zinc manganese flow battery and a power battery. The flow battery includes positive electrode, negative electrode, electrolyte and membrane. The corresponding flow battery includes positive and negative pumps, pipelines and storage tanks. For the power battery, the electrolyte is stored in the porous electrode, while for the flow battery, the positive and negative electrolyte flows through the positive and negative electrodes through the pump and pipeline and finally returns to the storage tank to realize the circulation of electrolyte in the electrode chamber and storage tank. In addition, the positive and negative electrode electrolyte is a neutral solution of zinc salt and manganese salt with specific composi- (Continued)

tion. During charging, $MnO_2$ of the positive electrode can be oxidized directly to $\alpha$-$MnO_2$. During discharge, $MnO_2$ dissolves into $Mn^{2+}$.

7 Claims, 11 Drawing Sheets

(56) References Cited

FOREIGN PATENT DOCUMENTS

| CN | 105280943 A | * | 1/2016 | ............. Y02E 60/50 |
|----|-------------|---|--------|--------------------------|
| CN | 105280964 A |   | 1/2016 |                          |
| CN | 105336971 A |   | 2/2016 |                          |
| CN | 109037794 A |   | 12/2018 |                         |
| CN | 110911652 A | * | 3/2020 | ............. B82Y 30/00 |
| KR | 20000015510 A | * | 3/2000 | ............. H01M 4/38 |
| WO | WO-2019241531 A1 | * | 12/2019 | ......... H01M 10/054 |

OTHER PUBLICATIONS

Machine translation of Shu. CN 109037794. Originally available Dec. 18, 2018 (Year: 2018).*
Machine translation of Zhang et al. CN 105280943. Originally available Jan. 27, 2016 (Year: 2016).*
Machine translation of KR-20000015510-A, Oh et al. Originally published Mar. 15, 2000. (Year: 2000).*
Machine translation of Liu CN-110911652-A. Originally published Mar. 24, 2020. (Year: 2020).*
Distrupol. Polymer abbreviations. (Year: 2025).*
Thermo Fisher. PSF (Year: 2025).*
Fu. SPEEK/epoxy resin composite membranes in situ polymerization for direct methanol fell cell usages. Journal of Power Sources, 165(2), 708-716. (Year: 2006).*

* cited by examiner

NEUTRAL ZINC MANGANESE SECONDARY BATTERY AND ELECTROLYTE

TECHNICAL FIELD

The invention belongs to the field of petrochemical industry, in particular to a multi-metal non supported hydrofining catalyst and a preparation method thereof, as well as its application in the ultra-deep hydrodesulfurization and denitrification process of diesel fraction.

BACKGROUND TECHNOLOGY

The extensive use of fossil energy has caused serious environmental pollution, so the development and utilization of renewable energy is the key to the above problems. However, the discontinuity and instability of renewable energy make it difficult to use renewable energy directly, therefore, using energy storage technology to realize the continuous supply of renewable energy is the main programmes. Zinc based battery demonstrating excellent performance due to its low cost, highly electrochemical activity and high energy density, which has become a promising battery technology in large-scale energy storage. As a kind of zinc base battery, zinc-manganese battery is the most widely used primary battery at present, but it is difficult to turn on the corresponding secondary battery, which is mainly due to the collapse of cathode material in cycling process. At present, the main research of cathode materials are various oxides of manganese and the negative electrode is zinc sheet/zinc foil with electrolyte contains $Zn^{2+}$. The electrochemical reaction of the positive electrode in the process of charge and discharge is the intercalation/deintercalation of zinc ions and negative electrode is the deposition dissolution of zinc ions.

Previously, Yuehua et al. Reported "an aqueous zinc manganese secondary battery" (CN105336971A), the positive electrode is the co-intercalation of zinc and manganese ions and the oxidation deposition reaction of $Mn^{2+}$, the intercalation/deintercalation reaction will cause structural transformation and collapse of cathode materials, the cycle life of the battery is greatly inhibited. In addition, Cheng Jie et al. also reported "a kind of zinc-manganese flow battery (CN 101677135A), the positive reaction of the battery is based on the solid-solid conversion of $MnO_2/MnOOH$. However, the structural stability of the cathode material is very poor and the utilization rate of electrode active material is very low. In addition, dendrite problem of zinc negative electrode in alkaline environment seriously limits the cycle life of the battery; what's worse, the positive reaction of the battery is single electron transfer, and the specific capacity of the battery is relatively low. Prof. Huamin Zhang and others in our division also reported "one kind of zinc manganese secondary battery" (CN 105280964A), the positive electrode was based on solid-liquid phase conversion of $Mn^{2+}/MnO_2$, however, this battery system used strong acid electrolyte, which is very corrosive to zinc anode. In addition, during the charging process, $MnSO_4$ system electrolyte would accompany by the formation of $Mn^{3+}$ (equation 1) and the disproportionation side reaction of $MnO_2$ (equation 2) would be formed, which result serious capacity decay.

$$Mn^{2+}-e^-\Leftrightarrow Mn^{3+} E=1.56\ V\ vs.\ SHE \qquad \text{Equation 1}$$

$$2Mn^{3+}+2H_2O\Leftrightarrow MnO_2+4H^++Mn^{2+} \qquad \text{Equation 2}$$

CONTENT OF THE INVENTION

In order to solve the above problems, the specific technical scheme adopted by the invention is as follows, A neutral zinc manganese secondary battery comprises a zinc manganese power battery or a zinc manganese flow battery; The structure of zinc manganese power battery includes positive electrode, negative electrode, membrane, positive electrolyte and negative electrolyte; The zinc manganese flow battery consists of a single cell or two or more single cells in series and/or in parallel. The single battery comprises a positive end plate and a positive current collector, positive electrode, membrane, negative electrode, negative collector, negative end plate, positive and negative electrolyte storage tank with positive and negative electrolyte and pumps. The positive and negative electrolyte with the same composition that containing $Zn^{2+}$ and $Mn^{2+}$ aqueous solution. The anions in the aqueous solution include acetate ions with the pH range of 4-6, preferably pH=5.

When the battery was charged, $Mn^{2+}$ in the positive electrolyte is deposited in situ as $MnO_2$ on the porous electrode and $Zn^{2+}$ in the negative electrolyte is reduced to Zn, and the discharge reaction is the inverse reaction of the above reaction.

The preparation process of positive and negative electrolyte is to co-dissolve manganese salt and zinc salt in water to form a mixed aqueous solution as positive and negative electrolyte. The manganese salt is manganese acetate or/and manganese chloride, the zinc salt is zinc acetate or/and zinc chloride, the positive active material is manganese acetate or/and manganese chloride, and the negative active material is zinc acetate or/and zinc chloride. The molar concentration of zinc ion in the positive and negative electrolyte is 0.1-1.5 M, preferably 0.5-1.2 M, more preferably 1 M; the molar concentration of manganese ion is 0.1-1.5 M, preferably 0.5-1.2 M, more preferably 1 M, the molar concentration of acetate ion is 0.1-6 M, preferably 3-5 M, more preferably 4 M; The molar concentration of chloride ion is 0-3 M, preferably 0.5-2M, more preferably 1.5-2 M. The electrolyte also includes supporting electrolyte, One or more of them KAc, KCl, $K_2SO_4$, $NH_4Cl$, $(NH_4)_2SO_4$ with a concentration of 1-3 M.

The molar ratio of manganese salt to zinc salt is 0.5:1-3:1, preferably 0.8:1-1.5:1, more preferably 1:1; The ratio of acetate anion to manganese ion is 6:1-1:1, preferably 3:1-5:1, more preferably 4:1.

The positive and negative electrodes are prepared by coating activated carbon on one or both sides of the carbon felt as the composite porous electrode. The activated carbon material is one or more of super P, carbon black, carbon nanotube or Keqin black, super P is preferred. The coating amount is 2-20 $mg/cm^2$, preferably 10-15 $mg/cm^2$, more preferably 12 $mg/cm^2$.

The zinc manganese secondary battery membrane is a porous composite membrane, which coating with polymer resin. Porous membrane prepared by one or more polymers of PES, PVC, PSF or PE and the positive side of the porous membrane is coated with a polymer c polymer resin is one or two of SPEEK, PBI or Nafion 115, wherein the base material is preferably PE polymer, and the coating polymer resin is preferably Nafion resin; Composite membrane substrate with the pore diameter of 10-50 nm and the porosity is 30-60%.

The mechanism of battery charging and discharging is liquid-solid conversion. During the charging process, the electrochemical reaction of the positive electrode is $Mn^{2+}$ to $MnO_2$ and the generated $MnO_2$ is deposited on the porous electrode, the negative electrode is Zn deposition from $Zn^{2+}$. During the discharge process, $MnO_2$ of the positive electrode is dissolved into $Mn^{2+}$, and Zn deposited on the negative electrode is oxidized into $Zn^{2+}$.

Zinc manganese secondary battery includes zinc manganese power battery or zinc manganese flow battery. The structure of zinc manganese battery includes positive electrode, negative electrode, membrane, positive electrolyte, negative electrolyte; The zinc manganese flow battery consists of one single cell or two cells composed of an electric stack formed by series and/or parallel connection; The single cell comprises a positive end plate, a positive current collector, a positive electrode, membrane, negative electrode, negative collector, negative end plate, positive and negative electrolyte storage tank and pump equipped with positive and negative electrolyte.

The positive and negative electrolyte for neutral zinc manganese secondary battery are the same composition with zinc and manganese ions, the anions in the aqueous solution include acetate ions, and the pH range of the electrolyte is 4-6, preferably PH=5; The molar concentration of zinc ion in the positive and negative electrolyte is 0.1-1.5 M, preferably 0.5-1.2 M, more preferably 1 M; The molar concentration of manganese ion is 0.1-1.5 M, preferably 0.5-1.2 M, more preferably 1 M; The molar concentration of acetate ion is 0.1-6 M, preferably 3-5 M, more preferably 4 M; The molar concentration of chloride ion is 0-3 M, preferably 0.5-2 M, more preferably 1.5-2M; The molar ratio of manganese salt to zinc salt is 0.5:1-3:1, preferably 0.8:1-1.5:1, more preferably 1:1; the ratio of acetate anion to manganese ion is 6:1-1:1, preferably 3:1-5:1, more preferably 4:1.

The Invention has the Following Beneficial Effects

1. Compared with the traditional zinc manganese battery, acetate anion is added to the positive electrolyte innovatively. Due to the coordination of acetate anion, $Mn^{2+}$ in the positive electrolyte can be deposited on the electrode in the form of $MnO_2$ during oxidation and can be reversibly transformed into $Mn^{2+}$ in the reduction process, realizing a reaction mechanism of liquid-solid conversion.

$$2MnAc_2 + 2H_2O - 2e^- \Leftrightarrow MnO_2 + 4HAc + Mn^{2+} E = 0.82V$$
$$\text{vs. } SHE \qquad \text{Equation 3}$$

The electrode reaction of the positive electrode is a dissolution/deposition reaction between soluble $Mn^{2+}$ and solid $MnO_2$, which is a reversible double electrons transfer reaction (theoretical capacity: 616 mAh/g), the specific capacity of the battery is greatly improved.

2. The electrochemical reaction mechanism of the manganese salt added with acetate is completely different from that without acetate. The electrolyte without acetate is actually a two-step reaction: first, $Mn^{2+}$ is oxidized into $Mn^{3+}$ and then $Mn^{3+}$ is disproportionated to form $MnO_2$ (equation 2). The results show that $MnO_2$ formed by disproportionation side reaction unevenly distribute on the electrode surface, the contact force with the electrode surface is very weak or not in contact, and even part of it is free to electrolysis, it is difficult to achieve complete discharge during battery discharge, and $MnO_2$ accumulation will occur in the positive electrode, so the cycle of the battery is great inhibited.

3. After adding acetate, the dissolution deposition mechanism of $Mn^{2+}$ can well avoid the traditional intercalation/deintercalation reaction (e.g $Zn^{2+}/H^+$) reaction and lead to the structural transformation or even collapse, which limiting the cycling life of the battery; However, the positive electrode reaction of the above zinc manganese secondary battery is deposition-dissolution type The structure damage caused by ion embedding is avoided, and the cycle life of the battery is greatly improved.

4. The modification of cathode can effectively improve the surface roughness of carbon fiber and the crystallinity and contact force with carbon fiber substrate of $MnO_2$ deposited on the cathode was greatly improved, which promote the uniform and dense deposition of $MnO_2$ on the surface of the electrode. Therefore, the areal capacity of the positive electrode could reach 20 mAh/cm² and the cycling stability of the battery is further improved.

5. The zinc manganese system of the invention is a neutral system, the zinc dendrite problem of the negative electrode is greatly alleviated, and the electrolyte is environmentally friendly.

6. The use of polymer coated composite membrane can well avoid the corrosion of $CH_3COOH$ generated by the positive electrode during charging to electrodeposited zinc is conducive to the improvement of battery cycle stability and coulomb efficiency.

The electrode is coated with super P, the load is 12 mg/cm² and the pH of the electrolyte is adjusted to 1. The membrane material is composite membrane (PE is the substrate with Nafion resin as coating).

Figure 21:
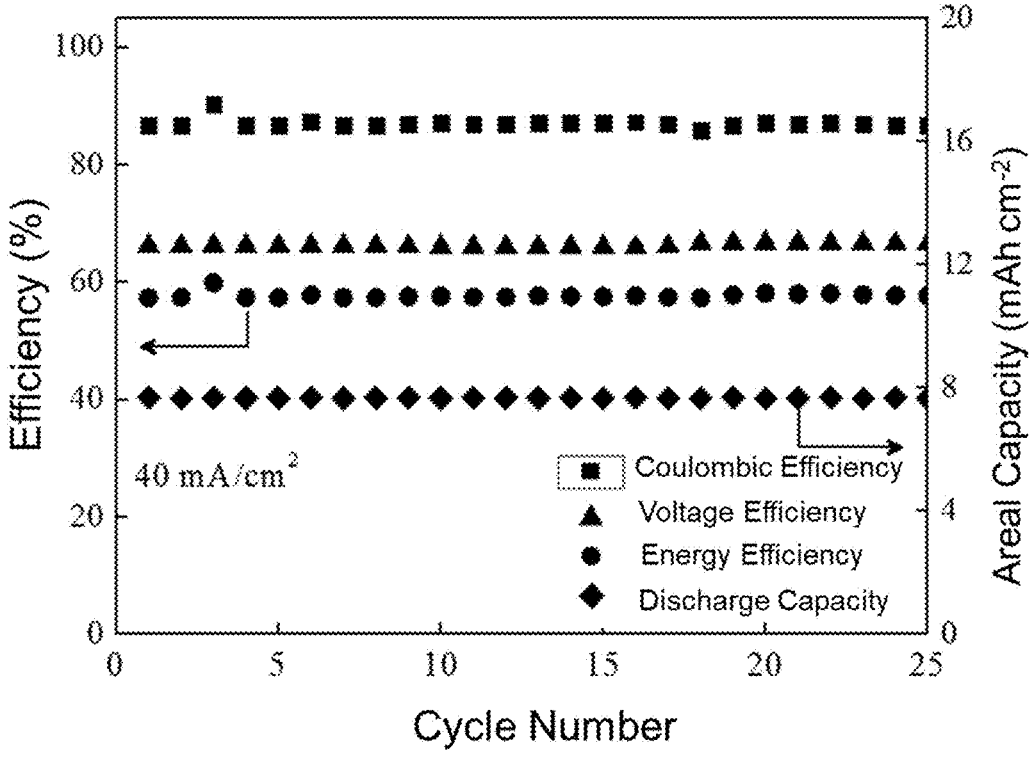

FIG. 21 shows the cycle performance of zinc manganese battery to the battery assembled comparative Example 4. The electrolyte composition is 0.5 M manganese acetate, 0.5 M zinc acetate, supporting electrolyte is 2 M KCl. The operating current density of the battery is 40 mA/cm². The electrode was coated with super P, the loading capacity was 12 mg/cm², and the pH of the electrolyte was adjusted to 9. The membrane material is composite membrane (PE is the substrate with Nafion resin as coating).

SPECIFIC EMBODIMENTS

In order to further illustrate the invention, the following embodiments are enumerated, but the scope of the invention defined in the claims is not limited.

Embodiment 1-24 are zinc manganese flow batteries assembled by a single battery, and the single battery successively includes a positive end plate, positive current collector, carbon felt positive electrode with frame, membrane, carbon felt negative electrode with frame, negative current collector, negative end plate, electrolyte storage tank and pump with positive and negative electrolyte. Electrolyte flow rate is 10 ml/min, charging current is 40 mA/cm$^2$, the cut-off condition of the battery is time cut-off, and the charging cut-off time is 10-30 mins, the safe voltage is set to 2.3 V and the discharge voltage is 0.1 v.

The electrode area is 48 cm$^2$, the thickness of carbon felt is 5 mm, and the compression ratio is 30%.

TABLE 1

| | | | | | | | | |
|---|---|---|---|---|---|---|---|---|
| details of assembling the battery under different conditions of Embodiment. | | | | | | | | |
| Embodiment | Electrolyte (mol/L) | Ac$^-$:Mn$^{2+}$ | Mn$^{2+}$:Zn$^{2+}$ | pH | Electrode coating and load (mg/cm$^2$) | Substrate and coating layer | Energy efficiency EE | Areal capacity (mAh/cm$^2$) |
| 1 | 0.5MMnAc, 0.5MZnAc, 2MKCl | 4:1 | 1:1 | 5 | Super P, 12 | PE, Nafion The pore diameter of the composite membrane substrate is 10-50 nm and the porosity is 30-60%. | 76% | 14 |
| 2 | 1MMnAc, 1MZnAc, 2MKCl | 4:1 | 1:1 | 5 | Super P, 12 | PE, Nafion | 75% | 21 |
| 3 | 1.5MMnAc, 1.5MZnCl$_2$, 2MKCl | 4:1 | 1:1 | 5 | Super P, 12 | PE, Nafion | 69% | 27 |
| 4 | 0.5MMnCl$_2$ + 0.5M MnAc, 1MZnCl$_2$, 2MKCl | 1:1 | 1:1 | 5 | Super P, 12 | PE, Nafion | 65% | 12 |
| 5 | 1MMnAc, 1MZnCl$_2$, 2MKCl | 2:1 | 1:1 | 5 | Super P, 12 | PE, Nafion | 68% | 15 |
| 6 | 1MMnAc, 1MZnCl$_2$, 2MKCl + 1MKAc | 3:1 | 1:1 | 5 | Super P, 12 | PE, Nafion | 65% | 18 |
| 7 | 1MMnAc, 1MZnAc, 2MKCl, 1MKAc | 5:1 | 1:1 | 5 | Super P, 12 | PE, Nafion | 63% | 15 |
| 8 | 1MMnAc, 1MZnAc, 2MKCl, 2MKAc | 6:1 | 1:1 | 5 | Super P, 12 | PE, Nafion | 60% | 13 |
| 9 | 1MMnAc, 1MZnAc, 0.5M ZnCl$_2$, 2MKCl | 4:1 | 2:3 | 5 | Super P, 12 | PE, Nafion | 69% | 18 |
| 10 | 1MMnAc, 1MZnAc, 1M ZnCl$_2$, 2MKCl | 4:1 | 1:2 | 5 | Super P, 12 | PES, Nafion | 68% | 17 |
| 11 | 1MMnAc, 1MZnAc, 2MKCl | 4:1 | 1:1 | 4 | Super P, 12 | PE, Nafion | 65% | 18 |
| 12 | 1MMnAc, 1MZnAc, 2MKCl | 4:1 | 1:1 | 4.5 | Super P, 12 | PE, Nafion | 67% | 19 |
| 13 | 1MMnAc, 1MZnAc, 2MKCl | 4:1 | 1:1 | 5.5 | Super P, 12 | PE, Nafion | 67% | 19 |
| 14 | 1MMnAc, 1MZnAc, 2MKCl | 4:1 | 1:1 | 6 | Super P, 12 | PE, Nafion | 66% | 18 |
| 15 | 1MMnAc, 1MZnAc, 2MKCl | 4:1 | 1:1 | 5 | Keqin black, 12 | PE, Nafion | 67% | 14 |
| 16 | 1MMnAc, 1MZnAc, 2MKCl | 4:1 | 1:1 | 5 | Carbon nanotubes, 12 | PE, Nafion | 68% | 16 |
| 17 | 1MMnAc, 1MZnAc, 2MKCl | 4:1 | 1:1 | 5 | Super P, 4 | PE, Nafion | 57% | 13 |
| 18 | 1MMnAc, 1MZnAc, 2MKCl | 4:1 | 1:1 | 5 | Super P, 8 | PE, Nafion | 57% | 13 |

TABLE 1-continued

| | | | | | details of assembling the battery under different conditions of Embodiment. | | | |
|---|---|---|---|---|---|---|---|---|
| Embodiment | Electrolyte (mol/L) | $Ac^-:Mn^{2+}$ | $Mn^{2+}:Zn^{2+}$ | pH | Electrode coating and load (mg/cm$^2$) | Substrate and coating layer | Energy efficiency EE | Areal capacity (mAh/cm$^2$) |
| 19 | 1MMnAc, 1MZnAc, 2MKCl | 4:1 | 1:1 | 5 | Super P, 16 | PE, Nafion | 55% | 13 |
| 20 | 1MMnAc, 1MZnAc, 2MKCl | 4:1 | 1:1 | 5 | Super P, 20 | PE, Nafion | 54% | 7 |
| 21 | 1MMnAc, 1MZnAc, 2MKCl | 4:1 | 1:1 | 5 | Super P, 12 | PES, Nafion | 64% | 14 |
| 22 | 1MMnAc, 1MZnAc, 2MKCl | 4:1 | 1:1 | 5 | Super P, 12 | PVC, Nafion | 56% | 13 |
| 23 | 1MMnAc, 1MZnAc, 2MKCl | 4:1 | 1:1 | 5 | Super P, 12 | PE, PBI | 68% | 15 |
| 24 | 1MMnAc, 1MZnAc, 2MKCl | 4:1 | 1:1 | 5 | Super P, 12 | PE, SPEEK | 62% | 15 |

Figure 1:
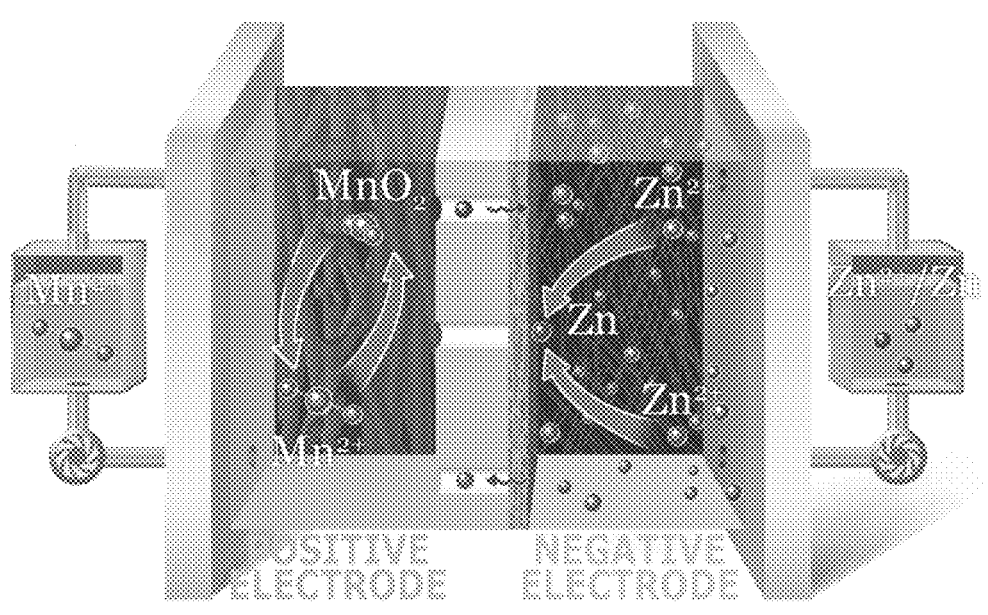
FIG. 1 is the structural diagram of zinc manganese secondary battery (including flow battery and battery).
Figure 2:
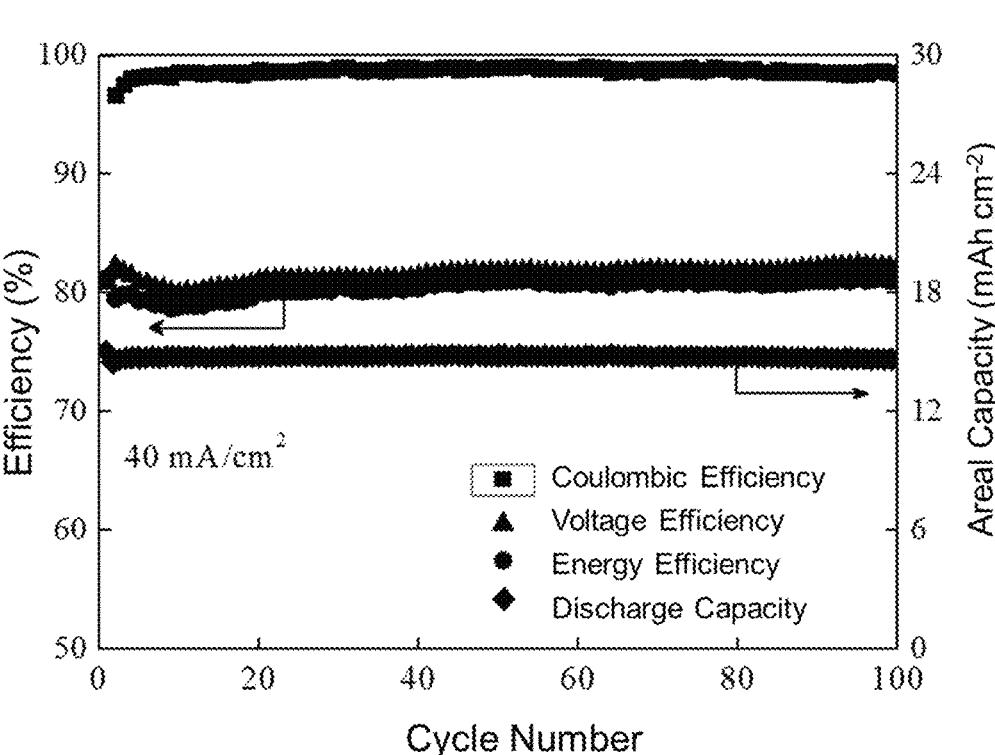
FIG. 2 is a cycle performance diagram of the zinc manganese flow battery assembled in embodiment 1. The composition of electrolyte is 0.5 M manganese acetate, 0.5 M zinc acetate, supporting electrolyte 2 M KCl. The working current density of the battery is 40 mA/cm². The electrode is a carbon felt electrode coated with super P with a load of 12 mg/cm². The membrane material is composite membrane (PE is the substrate with Nafion resin as coating).
Figure 3:
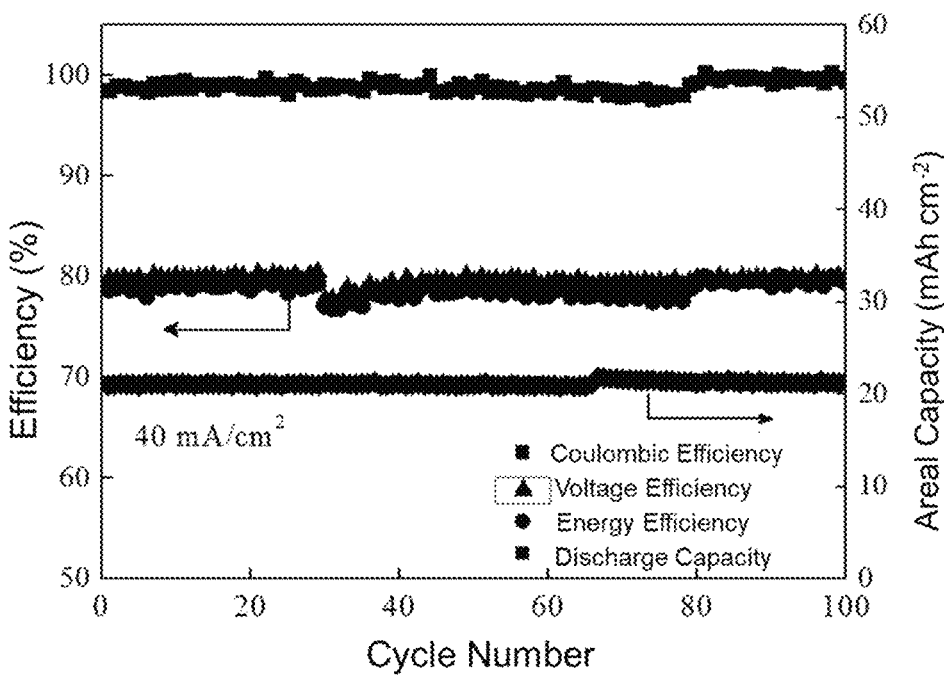
FIG. 3 is a cycle performance diagram of the zinc manganese flow battery assembled in embodiment 2. The electrolyte consists of 1 m manganese acetate, 1 m zinc chloride, 2 M KCl was employed as supporting electrolyte. The working current density of the battery is 40 mA/cm². Carbon felt electrode coated with super P, with a load of 12 mg/cm² was used as electrode. The membrane material is composite membrane (PE is the substrate with Nafion resin as coating).
Figure 4:
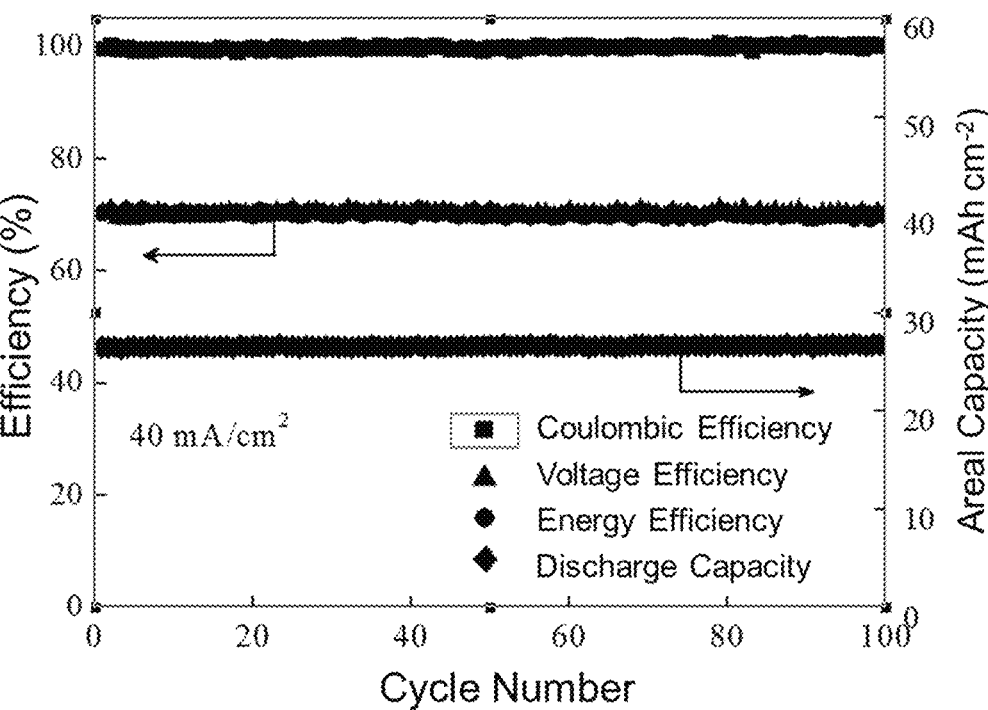
FIG. 4 is a cycle performance diagram of the zinc manganese flow battery assembled in embodiment 3. The electrolyte consists of 1.5 M manganese acetate and 1.5 M manganese acetate, supporting electrolyte is 2 M KCl. The working current density of the battery is 40 mA/cm². Carbon felt electrode coated with super P, with a load of 12 mg/cm² was used as electrode. The membrane material is composite membrane (PE is the substrate with Nafion resin as coating).

FIG. 3 (Embodiment 2) is the optimal condition (the ratio of acetate anion to manganese ion is 4:1, the concentrations of zinc ion and manganese ion are 1 M) battery cycle performance and capacity retention diagram, compared with FIG. 2 (Embodiment 1-0.5 mmnac, 0.5 mznac), the areal capacity of the high concentration electrolyte is greatly improved, and the energy efficiency of the battery is also relatively high. However, FIG. 4 (Embodiment 3-1.5 m MnAc, 1.5 m ZnAc) is close to the saturation concentration, the high concentration causes the viscosity of the electrolyte to be too high, and the energy efficiency of the battery decreases slightly, but the energy density of the battery is the highest.

Figure 5:
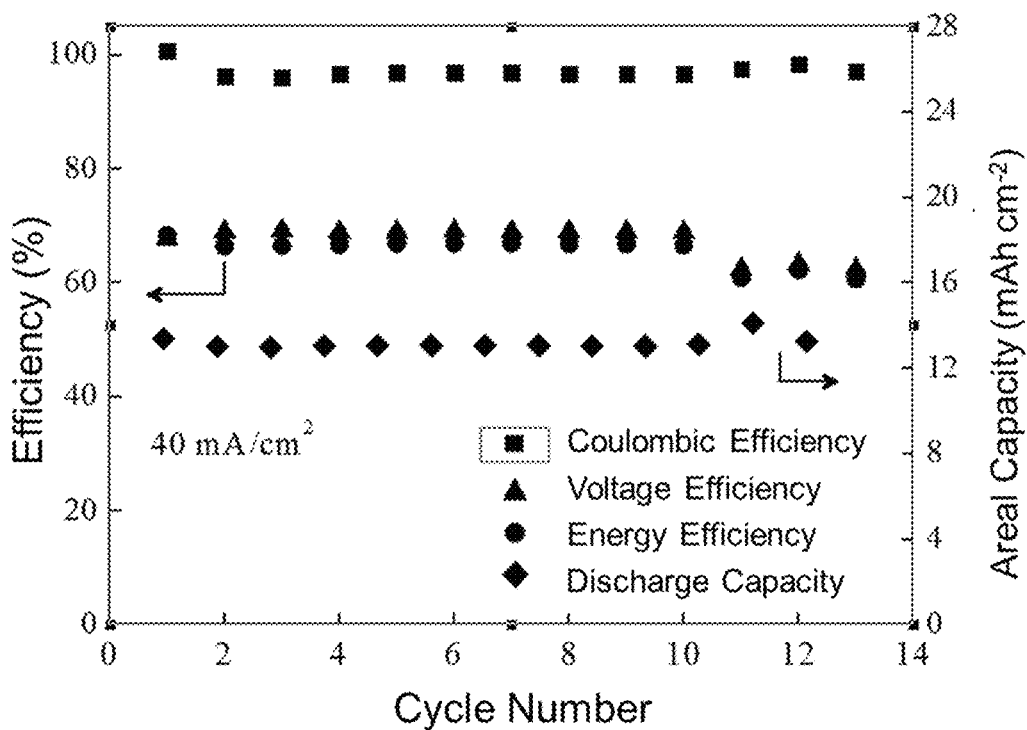
FIG. 5 shows the cycle performance of the zinc manganese flow battery assembled in embodiment 4. The electrolyte consists of 1 M manganese chloride, 1 M zinc chloride, 2 M KCl. The working current density of the battery is 40 mA/cm². Carbon felt electrode coated with super P, with a load of 12 mg/cm² was used as electrode. The membrane material is composite membrane (PE is the substrate with Nafion resin as coating).
Figure 6:
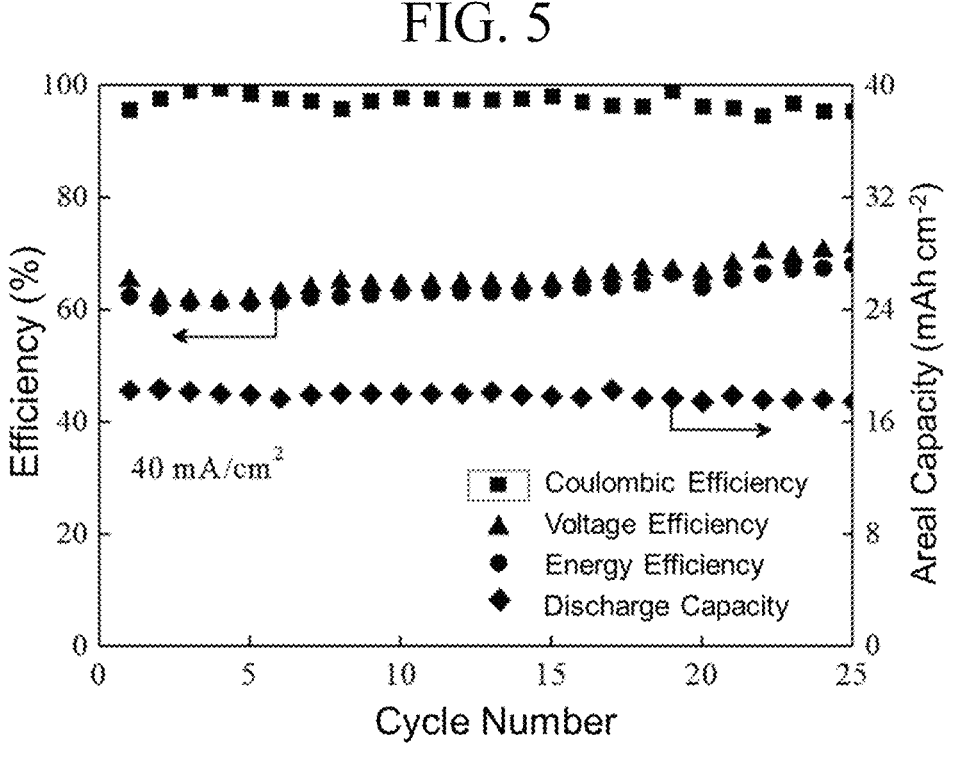
FIG. 6 is a cycle performance diagram of the zinc manganese flow battery assembled in embodiment 8. The electrolyte consists of 1 M manganese acetate, 1 M zinc acetate, 2 M KCl and 2 M KAc. The working current density of the battery is 40 mA/cm². Carbon felt electrode coated with super P, with a load of 12 mg/cm² was used as electrode. The membrane material is composite membrane (PE is the substrate with Nafion resin as coating).

Based on embodiment 2, it can be seen from other embodiments. Adjust the concentration ratio of acetate to manganese ion. When the ratio of acetate to manganese ion is low, FIG. 5 (Embodiment 4, the ratio of acetate to manganese ion is 1:1), acetate has a certain coordination effect on manganese ion, but it is not incomplete, so there is still a small amount of manganese ions that can't completely generate $MnO_2$, and some will generate $Mn^{3+}$, which cause disproportion side reaction and the corresponding efficiency and surface capacity are slightly lower. However, when the concentration of acetate reaches a high level, FIG. 6 (embodiment 8, the ratio of acetate to manganese ion is 6:1), excessive acetate coordination will limit the kinetic of the positive electrode. Therefore, the battery efficiency and areal capacity are inhibited. Therefore, the ratio of acetate to manganese ion is preferably 4:1.

Figures 7, 8:
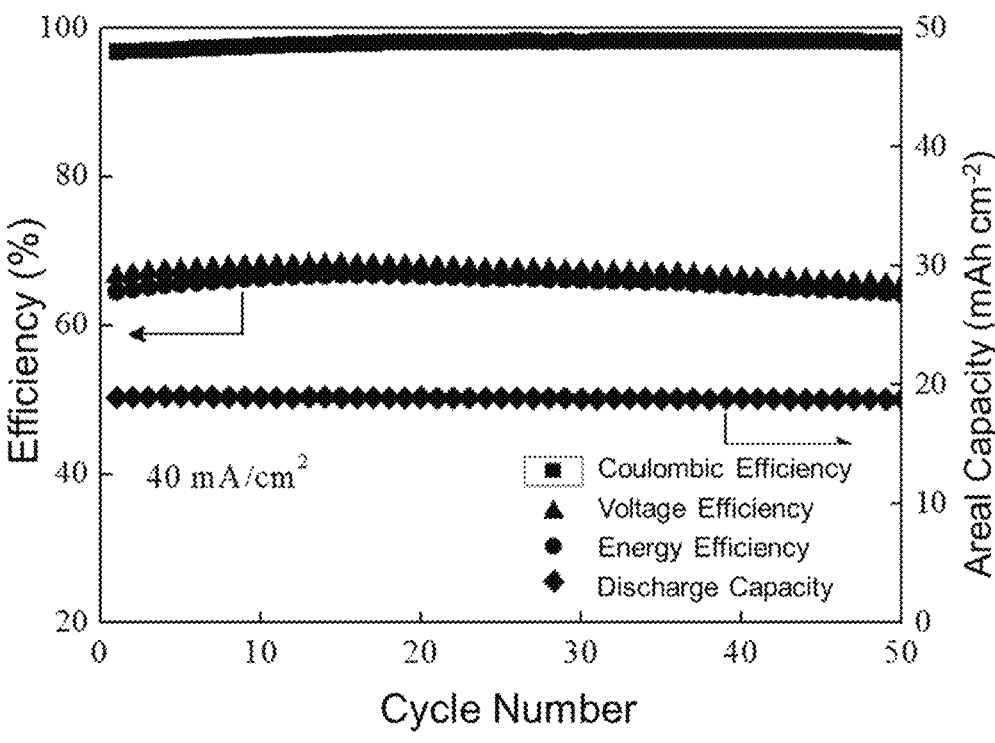
FIG. 7 is a cycle performance diagram of the zinc manganese flow battery assembled in embodiment 9. The electrolyte consists of 1 M manganese acetate, 1 M zinc acetate, 0.5 M zinc chloride, and the supporting electrolyte is 2 M KCl. The operating current density of the battery is 40 mA/cm², the electrode is carbon felt electrode, the electrode is coated with super P, and the loading capacity is 12 mg/cm². The membrane material is composite membrane (PE is the substrate with Nafion resin as coating)
FIG. 8 is a cycle performance diagram of the zinc manganese flow battery assembled in embodiment 10. The composition of electrolyte is 1 M manganese acetate, 1 M zinc acetate, 1 M zinc chloride, and the supporting electrolyte is 2 M KCl. The operating current density of the battery is 40 mA/cm², the electrode is carbon felt electrode coated with super P with the loading capacity is 12 mg/cm². The membrane material is composite membrane (PE is the substrate with Nafion resin as coating).

Adjusting the concentration ratio of manganese ion and zinc ion (FIG. 7 (embodiment 9) and FIG. 8 (embodiment 10)), by increasing zinc ion content enables the concentration ratio reach 2:3 or 1:2, the concentration of the electrolyte is close to saturation, which limited the migration rate of ion, thus, the efficiency of the battery decreases obviously, and the excess zinc ion has no effect on the capacity of the battery. The ratio of manganese ion to zinc ion is preferably 1:1.

Figure 9:
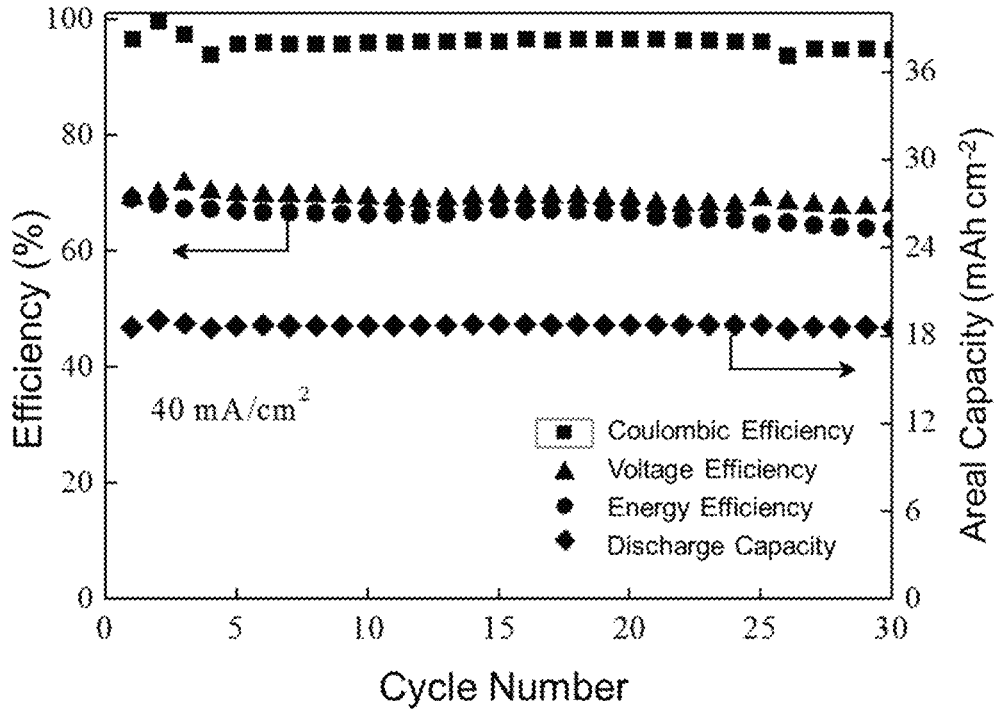
FIG. 9 is a cycle performance diagram of the zinc manganese flow battery assembled in embodiment 11. The electrolyte consists of 1 M manganese acetate, 1 M zinc acetate, supporting electrolyte 2 M KCl. Adjust pH to 1, and the working current density of the battery is 40 mA/cm². The positive electrode is coated with super P with a load of 12 mg/cm². The membrane material is composite membrane (PE is the substrate with Nafion resin as coating).
Figure 10:
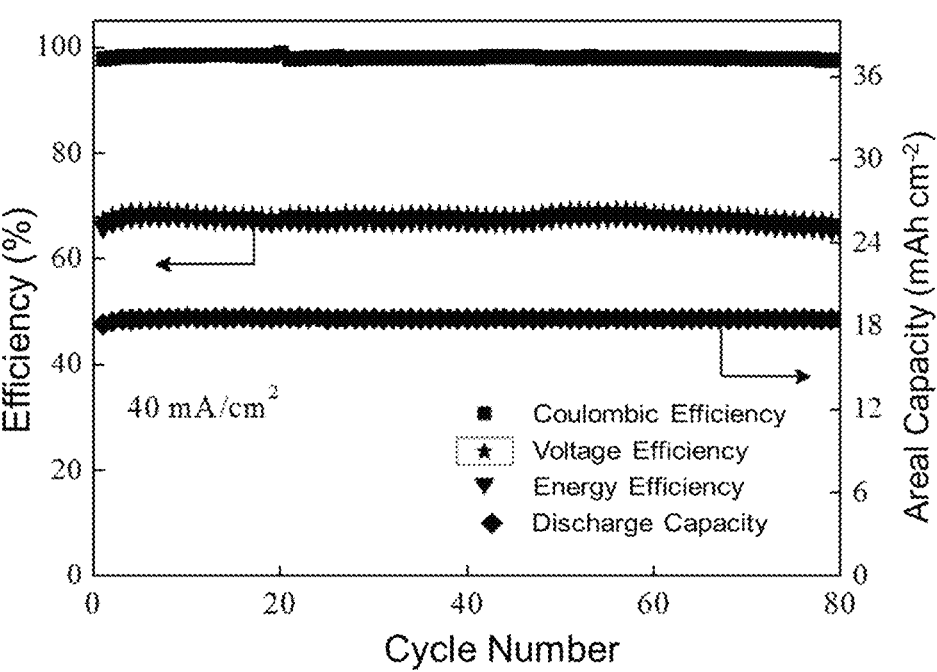
FIG. 10 shows the cycle performance of the zinc manganese flow battery assembled in embodiment 14. The electrolyte consists of 1 M manganese acetate, 1 m zinc acetate, supporting electrolyte is 2 M KCl. Adjust pH to 14, the working current density of the battery is 40 mA/cm², the electrode is carbon felt coated with super P with the loading capacity of 12 mg/cm². The membrane material is composite membrane (PE is the substrate with Nafion resin as coating).

By adjusting the pH value of the electrolyte to 4 (embodiment 11) (FIG. 9), 4.5 (embodiment 12) and 5 (embodiment 13), 5.5 (Embodiment 14) (FIG. 10), the coordination effect of acetate ion and manganese ion in electrolyte is slightly weakened, and the manganese ion in the electrolyte may intend to form $Mn^{3+}$. The efficiency and areal capacity of the battery decreased slightly.

Figure 11:
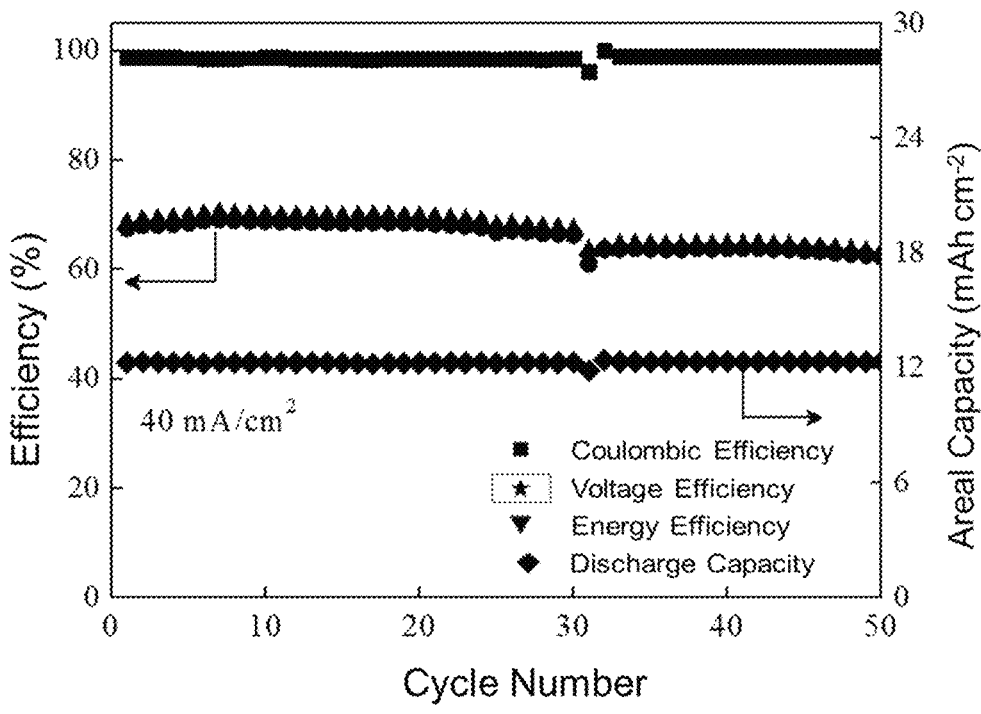
FIG. 11 shows the cycle performance of the zinc manganese flow battery assembled in embodiment 15. The electrolyte consists of 1 M manganese sulfate, 1 M zinc sulfate, supporting electrolyte is 1 M potassium sulfate. The working current density of the battery is 40 mA/cm². The electrode is a carbon felt electrode, coated with Cochin black, with a load of 12 mg/cm². The membrane material is composite membrane (P PE is the substrate with Nafion resin as coating).
Figure 12:
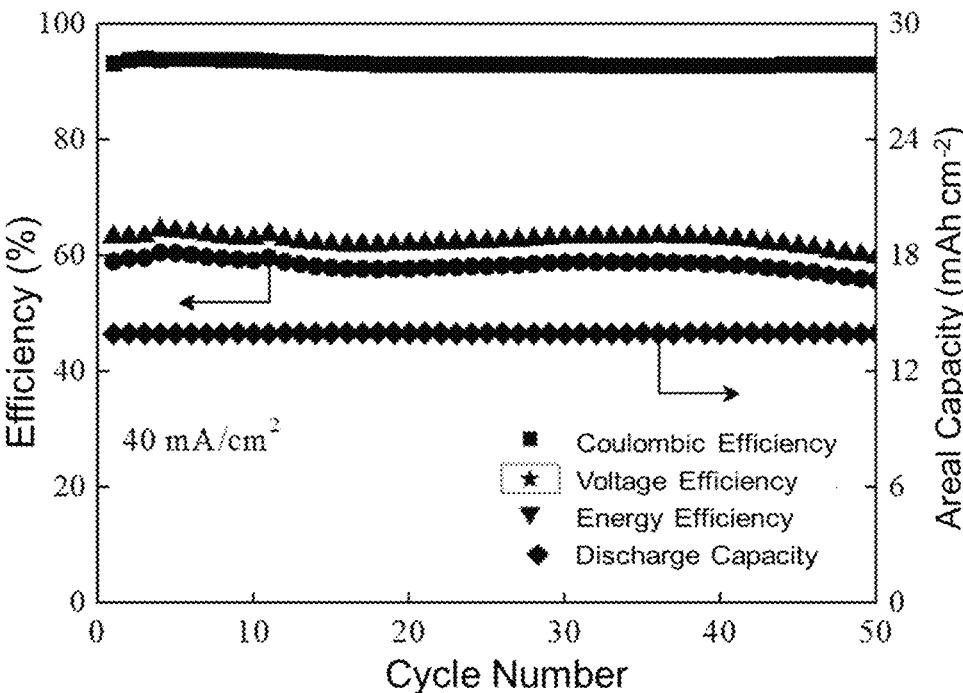
FIG. 12 shows the cycle performance of the zinc manganese flow battery assembled in proportion 17. The electrolyte consists of 1 M manganese acetate, 1 M manganese chloride, supporting electrolyte is 2 M KCl. The working current density of the battery is 40 mA/cm², and the electrode is coated with Super P with a load of 4 mg/cm². The membrane material is a composite membrane (PE is the substrate with Nafion resin as coating).
Figure 13:
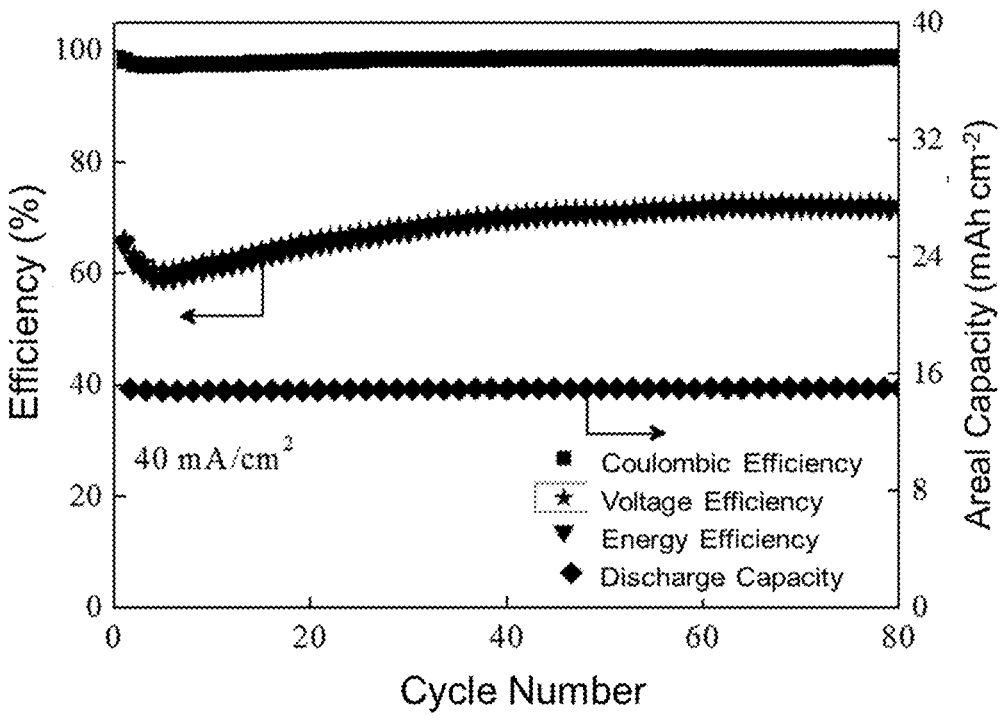
FIG. 13 is the charge-discharge curve and cycle performance diagram of the zinc manganese flow battery assembled in embodiment 20. Electrolyte composition is: 1 M manganese acetate, 1 M zinc acetate, and the supporting electrolyte is 2 M KCl. Operating current density of battery is 40 mA/cm², the electrode is coated with super P, and the loading capacity is 20 mg/cm². The membrane material is composite membrane (PE is the substrate with Nafion resin as coating).

Replacing the coated super P with Keqin black, FIG. 11 (embodiment 15), because of the binding force between the latter and carbon fiber is weaker, which is not conducive to the deposition of MnO2 on the surface of carbon fiber, so the areal capacity of the battery decreases. Reducing the loading capacity of super p in FIG. 12 (Embodiment 17), the roughness of the electrode surface decreases seriously, and the corresponding deposition areal capacity of the crystallinity of manganese dioxide decreased seriously, so the energy efficiency of the battery also decreased significantly. Increase the content of super p to 20 mg/cm$^2$ (FIG. 13 (Embodiment 20)), because the content of super P is too high, the porosity of carbon felt electrode will be greatly reduced, the deposition space of manganese dioxide is reduced, so the areal capacity of the battery decreases seriously, and the efficiency of the battery also decreases. It is preferred that the electrode coating is super P and the loading is 12 mg/cm$^2$.

Figure 14:
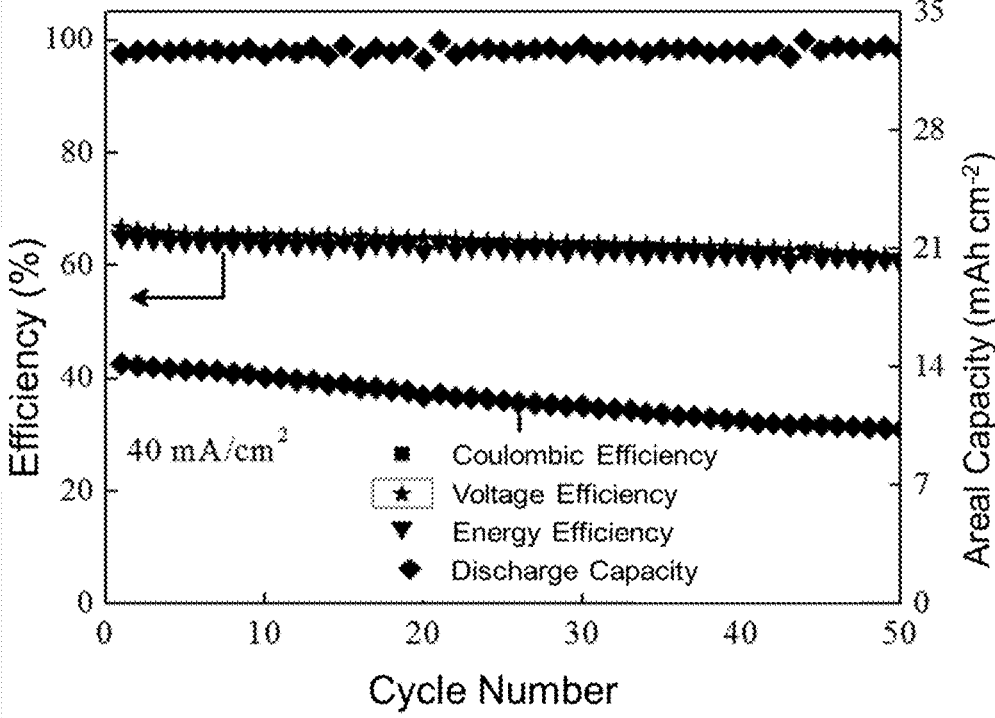
FIG. 14 is a cycle performance diagram of the zinc manganese flow battery assembled in embodiment 21. The electrolyte consists of 1 M manganese acetate, 1 M zinc acetate, supporting electrolyte is 2 M KCl. The working current density of the battery is 40 mA/cm², and the electrode is coated with super P with a load of 12 mg/cm². The membrane material is a composite membrane (PE is the substrate with Nafion resin as coating)

Replacing the substrate of membrane with PES FIG. 14 (embodiment 21), the efficiency and areal capacity of the battery are reduced. This is mainly because the PES substrate is not conducive to the conduction of neutral ions, the polarization of the battery is serious, and the corresponding energy efficiency is reduced.

Figures 15, 16:
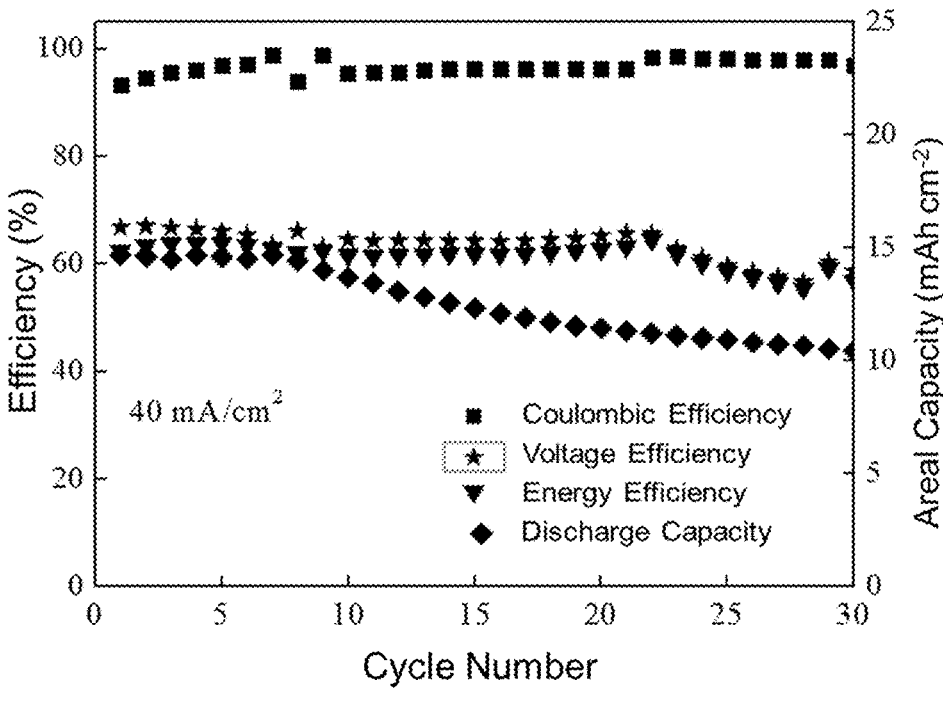
FIG. 15 is a cycle performance diagram of the battery assembled in embodiment 24. The electrolyte consists of 1 M manganese acetate and 1 M zinc acetate, supporting electrolyte is 2M KCl. The working current density of the battery is 40 mA/cm², and the electrode is coated with super P with the loading capacity is 12 mg/cm². The membrane material is a composite membrane (PE is the substrate with Nafion resin as coating).
FIG. 16 is a cycle performance diagram of the battery assembled in embodiment 2 of the zinc manganese battery. The electrolyte consists of 1 M manganese acetate, 1 M zinc acetate, supporting electrolyte is 2 M KCl. The working current density of the battery is 20 mA/cm², and the current is 40 mA/cm². The electrode is coated with super P with a load of 12 mg/cm². The membrane material is composite membrane (PE is the substrate with Nafion resin as coating)

Similar to FIG. 14, FIG. 15 (embodiment 24) after replacing the coating layer with speek also makes it difficult to conduct the supporting electrolyte in the battery, and the performance of the battery decreases seriously. It is preferred that the substrate is PE and the coating is Nafion.

Embodiments 25-27 are zinc manganese batteries assembled by a single battery, wherein the structure of zinc manganese batteries successively includes positive electrode, negative electrode, diaphragm, positive electrolyte and negative electrolyte; Battery performance test: the flow rate of electrolyte is 10 ml/min, the charging current is 40 mA/cm$^2$, the cut-off condition of battery is time cut-off: the charging cut-off time is 10-30 mins, the safety voltage is set to 2.3V, and the discharge voltage is 0.1V. The electrode area is 48 cm$^2$, the thickness of carbon felt is 5 mm, and the compression ratio is 30%.

FIG. 16 (battery embodiment 26) shows the performance of the battery under the optimal conditions, which can obtain relatively high energy efficiency and areal capacity.

For the zinc manganese flow battery assembled with single battery in comparative Example 1-5, the single battery successively includes positive end plate, positive current collector, carbon felt positive electrode with liquid flow frame, membrane, carbon felt negative electrode with liquid flow frame, negative current collector, negative end plate, electrolytic solution storage tank and pump equipped with positive and negative electrolyte. The electrolyte flow rate is 10 ml/min, the charging current is 40 mA/cm², and the cut-off condition of the battery is time cut-off: the charging cut-off time is 10-30 mins, the safety voltage is set to 2.3 V, and the discharge voltage is 0.1 V. The electrode area is 48 cm², the thickness of carbon felt is 5 mm, and the compression ratio is 30%.

Figure 19:
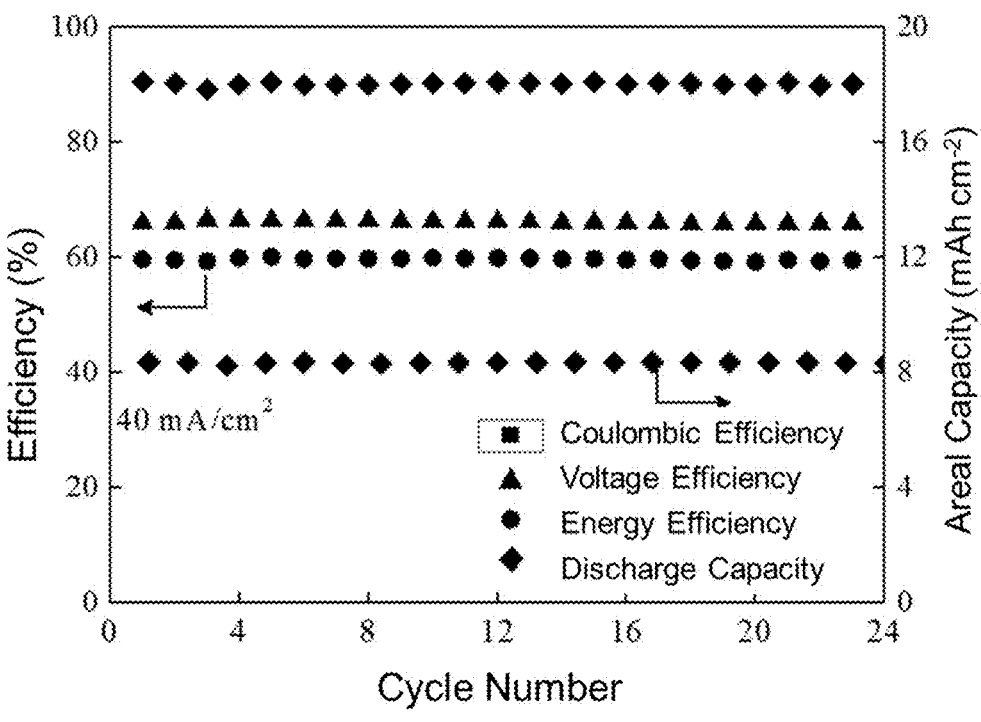
FIG. 19 shows the cycle performance of zinc manganese battery to the battery assembled in comparative Example 3. The electrolyte composition is 0.5 M manganese acetate, 0.5 M zinc acetate, supporting electrolyte is 2 M KCl. The operating current density of the battery is 40 mA/cm², the electrode is coated with super P with a loading capacity of 12 mg/cm². The membrane material is composite membrane (PE is the substrate with Nafion resin as coating).
Figure 20:
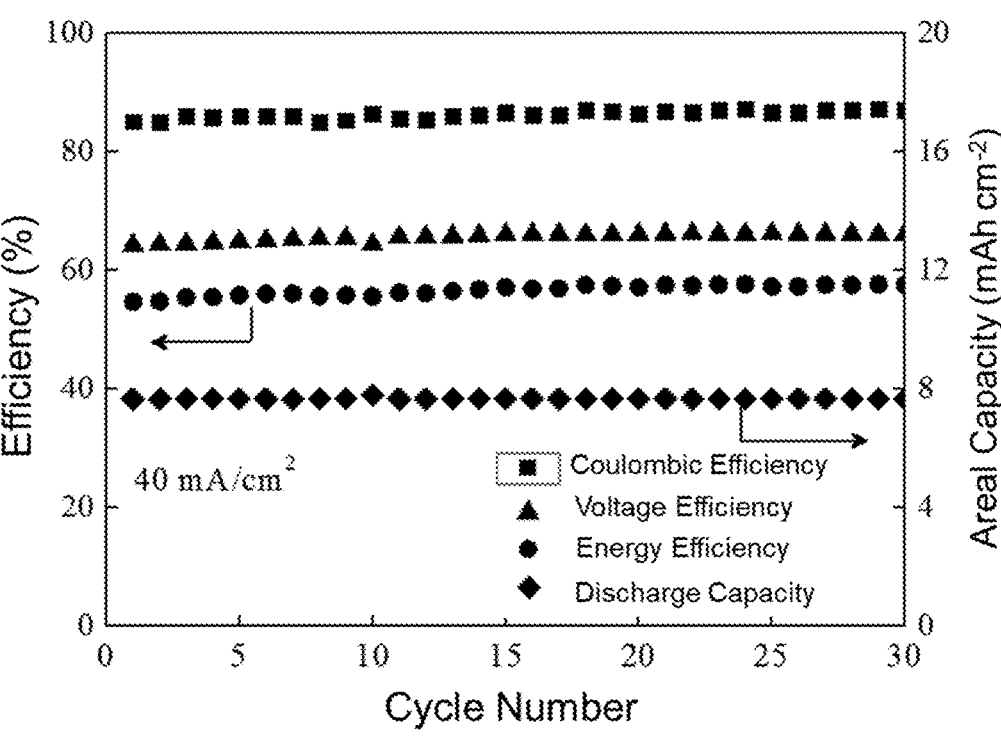
FIG. 20 shows the cycle performance of zinc manganese battery to the battery assembled comparative Example 4. The electrolyte composition is 0.5 M manganese acetate, 0.5 M zinc acetate, supporting electrolyte is 2 M KCl. The operating current density of the battery is 40 mA/cm².

When the acetate ion in the positive electrolyte is completely removed, a large amount of $Mn^{3+}$ will be generated manganese dioxide generated on the positive electrode and the substrate is relatively weak, and the crystallinity is also relatively poor, which will cause the precipitation fall off, so the surface capacity and efficiency of the battery will be reduced (Comparative Example 3, FIG. 19). Reduce the pH of the positive electrolyte to strong acidity, and the acetate radical in the positive electrolyte will form acetic acid with $H^+$ instead of coordinating with $Mn^{2+}$, therefore, a large amount of $Mn^{3+}$ will be generated during the charging process of the positive electrode, accompanied by obvious disproportionation side reactions, so the areal capacity and efficiency of the battery are very low (Comparative Example 4, FIG. 20). When the pH of the positive electrolyte is increased to strong alkalinity, manganese ions will form hydroxide precipitation, so the battery performance is very poor. (Comparative Example 5, FIG. 21).

| Embodiment | Electrolyte (mol/L) | $Ac^-$:$Mn^{2+}$ | $Mn^{2+}$:$Zn^{2+}$ | pH | Electrode coating and load (mg/cm²) | Substrate and coating layer | Energy efficiency EE | Areal capacity (mAh/cm²) |
|---|---|---|---|---|---|---|---|---|
| 25 | 0.5MMnAc, 0.5MZnAc, 2MKCl | 4:1 | 1:1 | 5 | Super P, 12 | PE, Nafion | 76% | 10 |
| 26 | 1MMnAc, 1MZnAc, 2MKCl | 4:1 | 1:1 | 5 | Super P, 12 | PE, Nafion | 76% | 16 |
| 27 | 1MMnAc, 1MZnAc, 2MKCl | 4:1 | 1:1 | 5 | Super P, 12 | PE, Nafion | 68% | 21 |

TABLE 2

Figure 17:
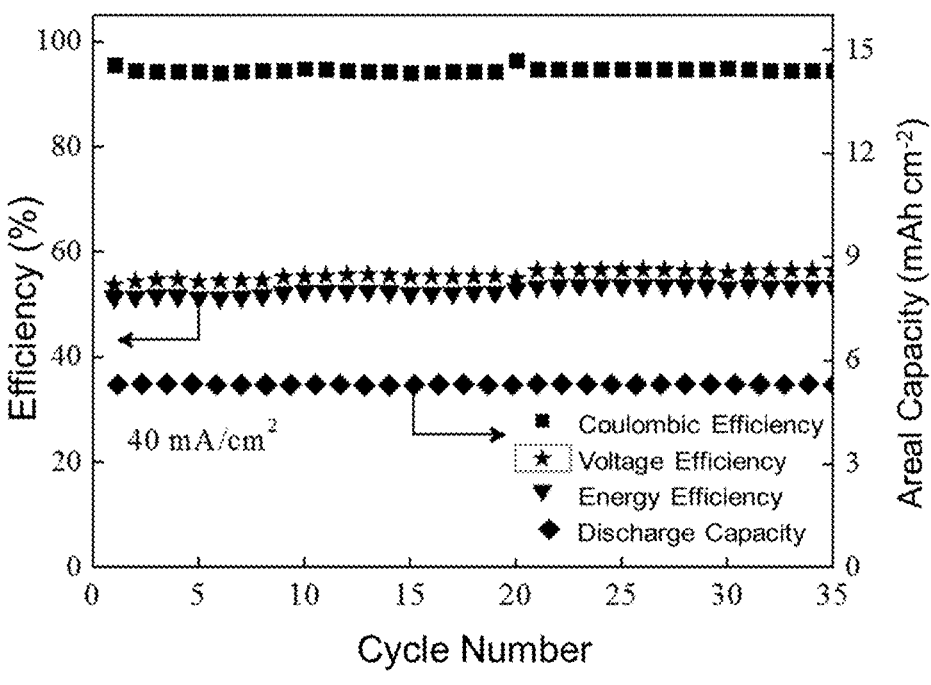
FIG. 17 is a cycle performance diagram of the battery assembled in comparative Example 1 of the zinc-manganese flow battery. The electrolyte composition is 0.5 M manganese sulfate, 0.5 M zinc sulfate, supporting electrolyte is 0.5 M K₂SO₄. The operating current density of the battery is 40 mA/cm², coated with super P on the electrode, with a load of 12 mg/cm². The membrane material is composite membrane (PE is the substrate with Nafion resin as coating).
Figure 18:
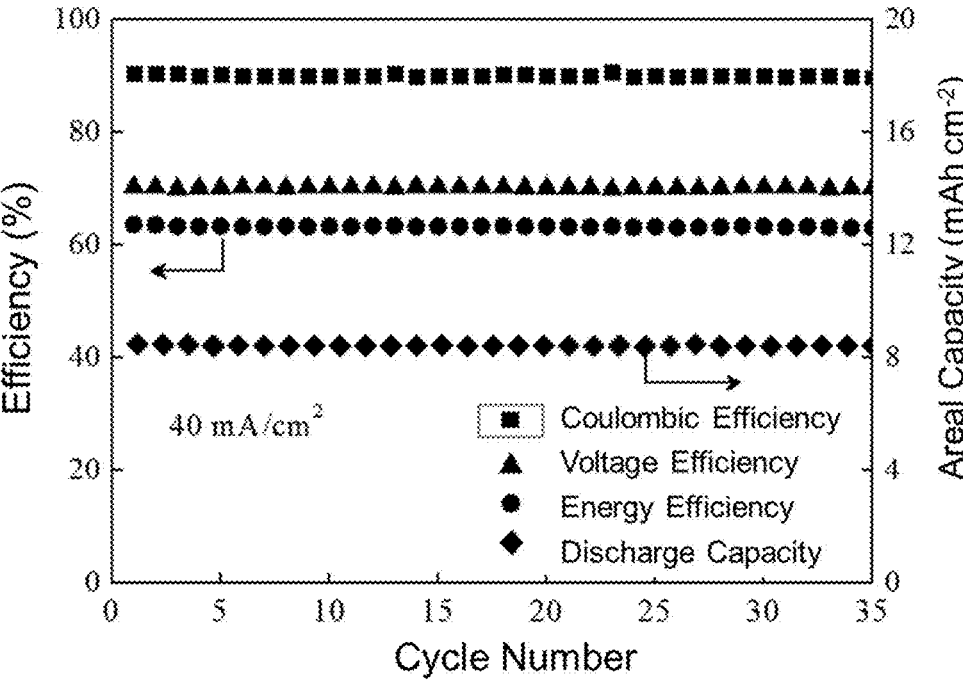
FIG. 18 shows the cycle performance of the zinc manganese battery to the battery assembled in comparative Example 2. Electrolyte composition is 0.5 M manganese acetate, 0.5 M zinc acetate, supporting electrolyte is 2 M KCl. The operating current density of the battery is 20 mA/cm². No coating is applied to the electrode. The membrane material is a composite membrane (PE is the substrate with Nafion resin as coating).

| Comparative example of assembled battery. | | | | | | | | |
|---|---|---|---|---|---|---|---|---|
| Comparative Example | Electrolyte (mol/L) | $Ac^-$:$Mn^{2+}$ | $Mn^{2+}$:$Zn^{2+}$ | pH | Electrode coating and load (mg/cm²) | Substrate layer and coating | EE | Areal Capacity (mAh/cm²) |
| 1 | 0.5M MnSO₄, 0.5M ZnSO4, 0.5M K₂SO₄ | 0:1 | 1:1 | 5 | Super P, 12 | PE, Nafion | 52% | 5 |
| 2 | 0.5MMnAc, 0.5MZnAc, 2MKCl | 4:1 | 1:1 | 5 | None | PE, Nafion | 60% | 8 |
| 3 | 0.5MMnAc, 0.5MZnAc, 2MKCl | 4:1 | 1:1 | 5 | Super P, 12 | PE, No | 62% | 8 |
| 4 | 0.5MMnAc, 0.5MZnAc, 2MKCl | 4:1 | 1:1 | 1 | Super P, 12 | PE, Nafion | 52% | 7 |
| 5 | 0.5MMnAc, 0.5MZnAc, 2MKCl | 4:1 | 1:1 | 9 | Super P, 12 | PE, Nafion | 53% | 6 | in the positive electrode of the battery, and with serious disproportionation side reactions, the areal capacity and efficiency of the battery will be seriously reduced (Comparative Example 1, FIG. 17). In addition, if the coating layer on the membrane electrode is removed, the acetate generated during the electrochemical reaction of the positive electrode will cross the membrane and corrode the deposited zinc, resulting in the decrease of the coulomb efficiency of the battery and greatly reduced stability of the battery (Comparative Example 2, FIG. 18). When the coating layer on the positive electrode is removed, due to the smooth surface of the carbon fiber, the contact force between the The neutral zinc manganese battery of the invention comprises a neutral zinc manganese flow battery and a power battery. The battery structure mainly includes: positive electrode, negative electrode, electrolyte and diaphragm. The corresponding flow battery also includes positive and negative pumps, pipelines and electrolyte storage tanks. For the two structures of flow battery and battery, the positive and negative materials are porous carbon felt and the membrane material is polymer material. For the power battery, the electrolyte is stored in the porous electrode, while for the flow battery, the positive and negative electrolyte flows through the positive and negative electrodes through the pump and pipeline and finally returns to the storage tank to realize the circulation of electrolyte in the electrode chamber and storage tank. In addition, the positive and negative electrode electrolyte is a neutral solution of zinc salt and manganese salt with specific composition, which is not corrosive to the electrode and collector. During charging, $Mn^{2+}$ of the positive electrode can be oxidized directly to $\alpha$-$MnO_2$ and $MnO_2$ dissolves into $Mn^{2+}$ during discharge. Different from the intercalation/deintercalation mechanism of traditional zinc manganese secondary battery, this dissolution deposition method can avoid the collapse of material structure in the cycle process, and the cycle life of the battery is greatly prolonged. In addition, the reaction is double electron transfer, which greatly improves the energy density of the battery.

The invention claimed is:

1. A zinc manganese secondary battery, comprising:
a positive electrode, a negative electrode, a positive electrolyte, a negative electrolyte, and a membrane disposed between the positive electrode and the negative electrode,
    wherein the positive electrolyte and the negative electrolyte are aqueous solutions containing potassium chloride, potassium acetate, or both, and a plurality of salts and having a pH value of 4-6,
    wherein the plurality of salts are selected from the group consisting of manganese acetate, manganese chloride, zinc acetate, and zinc chloride,
    wherein a molar ratio of manganese salt to zinc salt is 1:1 to 1:2, a molar ratio of potassium ion to manganese ion is 4:1 to 2:1, and a molar ratio of acetate anion to manganese ion is 4:1 to 1:1,
    wherein the membrane is a porous composite membrane comprising a substrate and a polymer resin coating on a surface exposed to the positive electrode, and
    wherein the substrate is prepared from one or more polymers of PES, PVC, PSF, and PE, and the polymer resin coating comprises one or more of SPEEK, PBI, and a sulfonated tetrafluoroethylene based fluoropolymer-copolymer.

2. The zinc manganese secondary battery according to claim 1, wherein the positive electrolyte and the negative electrolyte contains 0.1-1.5 M of zinc ion, 0.1-1.5 M of manganese ion, and 0.1-6 M of acetate ion.

3. The zinc manganese secondary battery according to claim 2, wherein the molar ratio of manganese salt to zinc salt is 1:1.

4. The zinc manganese secondary battery according to claim 1, wherein the positive electrode comprises a carbon felt substrate coated with activated carbon on one or both sides of the carbon felt substrate at a loading amount of 2-20 $mg/cm^2$.

5. The zinc manganese secondary battery according to claim 1, wherein the substrate has pores of diameter in the range of 10-50 nm and has a porosity of 30-60%.

6. The zinc manganese secondary battery according to claim 1, wherein, when being charged, $Mn^{2+}$ in the positive electrolyte is converted to $MnO_2$, which is deposited on the positive electrode, $Zn^{2+}$ in the negative electrolyte is converted to Zn, which is deposited on the negative electrode; and when being discharged, $MnO_2$ on the positive electrode is converted to $Mn^{2+}$, which dissolves in the positive electrolyte, and Zn on the negative electrode is oxidized into $Zn^{2+}$, which dissolves in the negative electrolyte.

7. An electrolyte for neutral zinc manganese secondary battery is an aqueous solution containing potassium chloride, potassium acetate, or both, and a plurality of salts selected from the group consisting of manganese acetate, manganese chloride, zinc acetate, and zinc chloride,
    wherein the electrolyte has a pH of 4-6, and contains 0.1-1.5 M of zinc ions, 0.1-1.5 M of manganese ions, and 0.1-6 M of acetate ion,
    wherein a molar ratio of manganese salt to zinc salt is 1:1 to 1:2, a molar ratio of potassium ion to manganese ion is 4:1 to 2:1, and a molar ratio of acetate anion to manganese ion is 4:1 to 1:1.

* * * * *